US011214759B2

(12) United States Patent
Yoon et al.

(10) Patent No.: US 11,214,759 B2
(45) Date of Patent: Jan. 4, 2022

(54) POLYMERIZABLE COMPOSITION, POLYMER CAPSULE AND FABRIC SOFTENER COMPOSITION COMPRISING THE SAME

(71) Applicants: LG Chem, Ltd., Seoul (KR); LG Household & Health Care Ltd., Seoul (KR)

(72) Inventors: Jeong Ae Yoon, Daejeon (KR); Su Jeong Kim, Daejeon (KR); Su Jee Kwon, Daejeon (KR); Sung Soo Yoon, Daejeon (KR); Yun Jin Cho, Daejeon (KR); Se Hoon Kim, Daejeon (KR); Mi Ae Park, Daejeon (KR); Kyung On Cha, Daejeon (KR)

(73) Assignees: LG Chem, Ltd.; LG Household & Health Care Ltd.

( * ) Notice: Subject to any disclaimer, the term of this patent is extended or adjusted under 35 U.S.C. 154(b) by 34 days.

(21) Appl. No.: 16/646,221

(22) PCT Filed: Sep. 14, 2018

(86) PCT No.: PCT/KR2018/010844
§ 371 (c)(1),
(2) Date: Mar. 11, 2020

(87) PCT Pub. No.: WO2019/054797
PCT Pub. Date: Mar. 21, 2019

(65) Prior Publication Data
US 2020/0277551 A1    Sep. 3, 2020

(30) Foreign Application Priority Data

Sep. 15, 2017  (KR) .................. 10-2017-0118724
Sep. 15, 2017  (KR) .................. 10-2017-0118725

(51) Int. Cl.
| | |
|---|---|
| *C11D 3/37* | (2006.01) |
| *C08F 212/08* | (2006.01) |
| *C08F 220/14* | (2006.01) |
| *C11D 3/00* | (2006.01) |
| *C11D 3/50* | (2006.01) |

(52) U.S. Cl.
CPC .......... *C11D 3/3769* (2013.01); *C08F 212/08* (2013.01); *C08F 220/14* (2013.01); *C11D 3/001* (2013.01); *C11D 3/505* (2013.01)

(58) Field of Classification Search
CPC ... C11D 3/505; C11D 17/0039; C11D 3/3715; C11D 3/502
See application file for complete search history.

(56) References Cited

U.S. PATENT DOCUMENTS

| | | | | |
|---|---|---|---|---|
| 5,919,742 A | * | 7/1999 | Tsuzuki | ............... C11D 3/3757 510/112 |
| 2004/0071742 A1 | | 4/2004 | Popplewell et al. | |
| 2004/0072719 A1 | | 4/2004 | Bennett et al. | |
| 2004/0072720 A1 | | 4/2004 | Brain et al. | |
| 2010/0286018 A1 | | 11/2010 | Hentze et al. | |
| 2013/0143789 A1 | | 6/2013 | Lee et al. | |
| 2015/0105307 A1 | | 4/2015 | Sasaki et al. | |
| 2016/0168508 A1 | | 6/2016 | Ribaut et al. | |
| 2016/0304646 A1 | | 10/2016 | Hsu et al. | |
| 2016/0367980 A1 | | 12/2016 | Inomata et al. | |
| 2018/0272308 A1 | * | 9/2018 | Sasaki | ...................... A23L 27/74 |
| 2019/0054440 A1 | * | 2/2019 | Mistry | ..................... A61Q 5/06 |
| 2019/0231658 A1 | * | 8/2019 | Lei | ........................... A61K 8/43 |

FOREIGN PATENT DOCUMENTS

| | | |
|---|---|---|
| AU | 728985 B2 | 1/2001 |
| CN | 101506344 A | 8/2009 |
| CN | 102015092 A | 4/2011 |
| CN | 105431227 A | 3/2016 |
| EP | 0822248 B1 | 11/2003 |
| EP | 1471137 B1 | 8/2013 |
| EP | 3184558 A1 | 6/2017 |
| JP | S5066546 U | 6/1975 |
| JP | 2002515930 A | 5/2002 |
| JP | 2007297751 A | 11/2007 |
| JP | 2009144306 A | 7/2009 |
| JP | 2015180486 A | 10/2015 |
| JP | 2016534159 A | 11/2016 |
| KR | 100441900 B1 | 7/2004 |
| KR | 20040085417 A | 10/2004 |
| KR | 20160101071 A | 8/2016 |
| WO | 2012018170 A1 | 2/2012 |
| WO | 2017102812 A1 | 6/2017 |
| WO | 2017107889 A1 | 6/2017 |

OTHER PUBLICATIONS

Search report from International Application No. PCT/KR2018/010844, dated Dec. 18, 2018.

(Continued)

*Primary Examiner* — John R Hardee
(74) *Attorney, Agent, or Firm* — Lerner, David, Littenberg, Krumholz & Mentlik, LLP

(57) ABSTRACT

A polymerizable composition, polymer capsules and a fabric softener composition are provided. The fabric softener composition includes polymer capsules in which cationic groups are introduced on the surfaces thereof, so that early release of a fragrance can be suppressed and aromas can be generated depending on rupture of a shell material of the polymer capsules by light friction at certain times. In addition, the polymer capsules have high adhesion to fibers and are not attached to fibers during washing to minimize the discharged fragrance, so that sufficient aromas can be provided even if a small amount of fragrance is used.

13 Claims, No Drawings

(56) References Cited

OTHER PUBLICATIONS

Sakai, et al., "Polymerizable gemini surfactants at solid/solution interfaces: Adsorption and polymerization on melamine formaldehyde particles and capsule fabrication." Journal of Colloid and Interface Science, vol. 343, (2010) (Accepted Nov. 20, 2009; Available online Nov. 27, 2009), pp. 491-495.

Z Janovic et al: "Croatica Chemica ACTA Synthesis and Crosslinking Polymerization of some Vinyl- Benzyl-N-Quaternary Salts", Research Institute, INA. Zagreb. Croatia. Yugoslavia a Croatica Chemica ACTA CCA. Sep. 9, 1977 (Sep. 9, 1977). XP055733964.

Cho et al: "Humidity sensors fabricated with photo-curable electrolyte inks using an ink-jet printing technique and their properties". Sensors and Actuators B: Chemical, Elsevier BV. NL. vol. 130. No. 2. Oct. 25, 2007 (Oct. 25, 2007). pp. 594-598. XP022550373.

Yuchen Fu et al: "pH-Induced Switchable Superwettability of Efficient Antibacterial Fabrics for Durable Selective Oil/Water Separation". ACS Applied Materials & Interfaces. vol. 9. No. 35. Aug. 23, 2017 (Aug. 23, 2017). pp. 30161-30170. XP055734287.

Extended European Search Report including Written Opinion for EP18857309.1 dated Oct. 8, 2020; 11 pages.

Chinese Search Report for Application No. CN201880059063.0 dated Feb. 2, 2021.

Kenichi Sakai, et al., "Polymerizable Gemini surfactants at solid/solution interfaces: Adsorption and polymerization on melamine formaldehyde particles and capsule fabrication", Journal of Colloid and Interface Science, Available Online Nov. 27, 2009, pp. 491-495.

* cited by examiner

POLYMERIZABLE COMPOSITION, POLYMER CAPSULE AND FABRIC SOFTENER COMPOSITION COMPRISING THE SAME

CROSS-REFERENCE TO RELATED APPLICATIONS

The present application is a national phase entry under 35 U.S.C. § 371 of International Application No. PCT/KR2018/010844, filed on Sep. 14, 2018, which claims priority from Korean Patent Application Nos. 10-2017-0118724 and 10-2017-0118725 filed on Sep. 15, 2017, the disclosures of which are incorporated herein by reference in their entirety.

TECHNICAL FIELD

The present application relates to a polymerizable composition, polymer capsules and a fabric softener composition comprising the same.

BACKGROUND ART

A fabric softener is used upon softening treatment of clothes to have the basic function of preventing static electricity and imparting flexibility. Besides, the fabric softener is used for the purpose of giving a refreshing feeling through imparting a lingering aroma feeling and preventing a bad smell due to detergent residues. However, in the conventional fabric softener, such a lingering aroma feeling has disappeared within a short period of time after washing, which has been a major cause of dissatisfaction for consumers.

In order to meet the consumers' desire for the lingering aroma, technologies for supporting effective materials using fragrance microcapsules of various components have been developed. A polymer compound, such as polyanion such as gum arabic, polyurethane, melamine, gelatin and a polyacrylic ester polymer, has been used as a component of the capsule shell. In addition, in order to maximize persistence of the lingering aroma, attempts have also been made to duplicate capsules or apply them with coating materials again.

DISCLOSURE

Technical Problem

The present application provides a polymerizable composition which can form polymer capsules capable of inhibiting early release of a supported fragrance material and dispersing the fragrance therein to the outside depending on rupture of the capsule shell material by light friction at certain times.

The present application provides polymer capsules capable of improving adhesion with fibers by imparting a cationic group to the capsule surface through chemical bonding.

The present application provides polymer capsules capable of providing a sufficient aroma, even when a small amount of a fragrance is used, by minimizing the amount of the fragrance released without being attached to fibers during washing.

Technical Solution

In the present application, the term alkyl group may mean an alkyl group having 1 to 20 carbon atoms, 1 to 16 carbon atoms, 1 to 12 carbon atoms, 1 to 8 carbon atoms or 1 to 4 carbon atoms, unless otherwise specified. The alkyl group may be a linear, branched or cyclic alkyl group and may be optionally substituted by one or more substituents.

In the present application, the term alkylene group may mean an alkylene group having 1 to 20 carbon atoms, 1 to 16 carbon atoms, 1 to 12 carbon atoms, 1 to 8 carbon atoms or 1 to 4 carbon atoms, unless otherwise specified. The alkylene group may be a linear, branched or cyclic alkylene group and may optionally be substituted by one or more substituents.

In the present application, the term aryl group or arylene group may mean a monovalent or divalent residue derived from a compound containing one benzene ring structure or a structure in which two or more benzene rings linked together with sharing one or two carbon atoms, or linked by any linker, or a derivative thereof, unless otherwise specified. The aryl group or arylene group may be, for example, an aryl group having 6 to 30 carbon atoms, 6 to 25 carbon atoms, 6 to 21 carbon atoms, 6 to 18 carbon atoms or 6 to 13 carbon atoms, unless otherwise specified.

In the present application, the term capsule is a structure including a hollow, where the shape of the capsule is not particularly limited, which may be used for supporting a component such as a fragrance or a cosmetic contained in a fabric softener or the like therein.

The present application relates to a polymerizable composition. The polymerizable composition of the present application can provide polymer capsules capable of supporting various active ingredients therein.

In the present application, the polymer capsule may be a cationic polymer capsule. Specifically, the cationic polymer capsule may be one in which a cationic group is introduced on the surface. More specifically, the cationic polymer capsule may be one in which the cationic group is introduced on the surface by chemical bonding. More specifically, the cationic polymer capsule may be one in which the cationic group is introduced on the surface by covalent bonding.

The polymerizable composition of the present application comprises a compound represented by Formula 1 below and a polymerizable monomer:

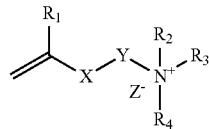

[Formula 1]

In Formula 1, $R_1$ is hydrogen or an alkyl group, X is an ester bond, an amide bond, a sulfonamide bond, a phosphoramide bond or an arylene group, Y is an alkylene group, $R_2$ and $R_4$ are each independently hydrogen, an alkyl group, an alkylalkanoate group or an aryl group, $R_3$ is an alkyl group, an alkylalkanoate group, an aryl group or a functional group represented by Formula 2 below, and $Z^-$ is an anion:

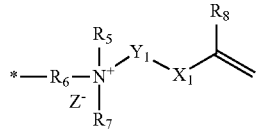

[Formula 2]

In Formula 2, * is a site bonded with $N^+$ in Formula 1, $R_6$ is an alkylene group or an arylene group, $R_5$ and $R_7$ are each independently an alkyl group, an containing alkylalkanoate group or an aryl group, $Y_1$ is an alkylene group, $X_1$ is an ester bond, an amide bond, a sulfonamide bond, a phosphoramide bond or an arylene group, $R_8$ is hydrogen or an alkyl group, and $Z^-$ is an anion.

Specifically, in Formula 1 above, $R_1$ may be hydrogen or an alkyl group having 1 to 6 carbon atoms. In Formula 1 above, X may be an ester bond or an arylene group, and specifically, X may be an ester bond or a phenylene group. In Formula 1 above, Y may be an alkylene group having 1 to 20 carbon atoms. In Formula 1 above, $R_2$ and $R_4$ may be each independently an alkyl group having 1 to 30 carbon atoms, an alkyl alkanoate group having 1 to 30 carbon atoms or an aryl group, specifically may be an alkyl group having 1 to 30 carbon atoms or an aryl group, and more specifically may be an alkyl group having 1 to 30 carbon atoms. In Formula 1 above, $R_3$ may be an alkyl group having 1 to 30 carbon atoms, an alkyl alkanoate group having 1 to 30 carbon atoms, an aryl group or a functional group represented by Formula 2 above. Also, $Z^-$ in Formula 1 above may be $Cl^-$, $Br^-$, $I^-$, $CH_3SO_3^-$ or $CH_3CO_2^-$. $R_2$ and $R_4$ in Formula 1 may be each independently an alkyl group having 10 or more carbon atoms or 12 or more carbon atoms, and may be an alkyl group having 18 or less carbon atoms or 16 or less carbon atoms.

In Formula 2 above, * may be a site bonded with $N^+$ in Formula 1. In Formula 2 above, $R_6$ may be an alkylene group having 1 to 30 carbon atoms. In Formula 2 above, $R_5$ and $R_7$ may be each independently an alkyl group having 1 to 30 carbon atoms, an alkyl alkanoate group having 1 to 30 carbon atoms or an aryl group, specifically may be an alkyl group having 1 to 30 carbon atoms or an aryl group, and more specifically may be an alkyl group having 1 to 30 carbon atoms. $R_5$ and $R_7$ in Formula 2 may be each independently an alkyl group having 10 or more carbon atoms or 12 or more carbon atoms, and may be an alkyl group having 18 or less carbon atoms or 16 or less carbon atoms. In Formula 2 above, $Y_1$ may be an alkylene group having 1 to 20 carbon atoms. In Formula 2 above, $X_1$ may be an ester bond or an arylene group, and specifically may be an ester bond or a phenylene group. In Formula 2 above, $R_8$ may be hydrogen or an alkyl group, specifically hydrogen or an alkyl group having 1 to 6 carbon atoms. In Formula 2 above, $Z^-$ may be $Cl^-$, $Br^-$, $I^-$, $CH_3SO_3^-$ or $CH_3CO_2^-$.

The compound represented by Formula 1 above may be included in the polymerizable composition of the present application as a cationic surfactant and/or a crosslinkable monomer.

When the compound represented by Formula 1 above is included as a crosslinkable monomer, the compound represented by Formula 1 above may be a compound represented by Formula 3 below:

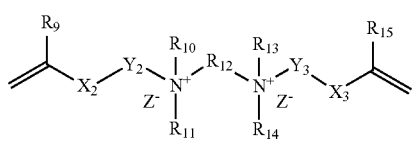

[Formula 3]

In Formula 3, $R_9$ and $R_{15}$ are each independently hydrogen or an alkyl group, $X_2$ and $X_3$ are each independently an ester bond, an amide bond, a sulfonamide bond, a phosphoramide bond or an arylene group, $Y_2$ and $Y_3$ are each independently an alkylene group, $R_{10}$, $R_{11}$, $R_{13}$ and $R_{14}$ are each independently hydrogen or an alkyl group, $R_{12}$ is an alkylene group or an arylene group, and $Z^-$ is an anion.

In Formula 3 above, $R_9$ and $R_{15}$ may be each independently hydrogen or an alkyl group having 1 to 6 carbon atoms. In Formula 3 above, $X_2$ and $X_3$ may be each independently an ester bond or an arylene group, and specifically may be an ester bond or an aryl group. In Formula 3, $Y_2$ and $Y_3$ may be each independently an alkylene group having 1 to 20 carbon atoms. In Formula 3, $R_{10}$, $R_{11}$, $R_{13}$ and $R_{14}$ may be each independently hydrogen or an alkyl group having 1 to 6 carbon atoms. In Formula 3, $R_{12}$ may be an alkylene group having 1 to 30 carbon atoms. $R_{12}$ may be an alkylene group having 2 to 12 carbon atoms. In Formula 3, $Z^-$ may be $Cl^+$, $Br^-$, $I^-$, $CH_3SO_3^-$ or $CH_3CO_2^-$. $R_{10}$, $R_{11}$, $R_{13}$ and $R_{14}$ in Formula 3 may be each independently an alkyl group having 10 or more carbon atoms or 12 or more carbon atoms, and may be an alkyl group having 18 or less carbon atoms or 16 or less carbon atoms.

When the polymerizable composition of the present application contains the compound of Formula 3 above as a crosslinkable monomer, the cationic group may be introduced on the surface of the polymer capsule derived from the composition. Specifically, the cationic group may be introduced on the surface of the capsule by chemical bonding. More specifically, the cationic group may be introduced on the surface of the capsule by covalent bonding.

In addition to the cationic group, the compound of Formula 3 additionally includes two kinds of vinyl groups, so that the compound represented by Formula 3 above can crosslink the shell of the polymer capsule derived from the polymerizable composition. Also, the crosslinkable monomer of Formula 3 contains an alkyl group or a phenyl group, which is non-polar, simultaneously with an ammonium group ($N^+$), which is a cation, whereby the polymer capsule derived from the polymerizable composition can have amphiphilicity. Furthermore, the compound represented by Formula 3 can make the polymer capsule to have amphiphilicity, and thus can also serve as a surfactant capable of forming emulsified particles during emulsion polymerization.

In one example of the present application, the compound represented by Formula 3 can be represented by Formula 3-1 or 3-2 below:

[Formula 3-1]

[Formula 3-2]

In Formulas 3-1 and 3-2 above, $R_1$ may be hydrogen or an alkyl group having 1 to 6 carbon atoms or 1 to 4 carbon atoms, and $Z^-$ may be $Cl^-$, $Br^-$, $I^-$, $CH_3SO_3^-$ or $CH_3CO_2^-$.

In Formula 3-1 above, n may be an integer of 1 to 28, 1 to 24, 2 to 20 or 2 to 16. In Formula 3-2 above, n may be an integer of 1 to 28, 1 to 24, 1 to 20, 2 to 16 or 2 to 12.

When the compound represented by Formula 1 above is included as a cationic surfactant, the compound represented by Formula 1 above may be a compound represented by Formula 4 below:

[Formula 4]

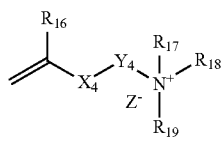

In Formula 4, $R_{16}$ is hydrogen or an alkyl group, $X_4$ is an ester bond, an amide bond, a sulfonamide bond, a phosphoramide bond or an arylene group, $Y_4$ is an alkylene group, $R_{17}$, $R_{18}$ and $R_{19}$ are each independently an alkyl group, an alkylalkanoate group or an aryl group, and $Z^-$ is an anion.

Specifically, $R_{16}$ in Formula 4 may be hydrogen or an alkyl group having 1 to 6 carbon atoms. In Formula 4, $X_4$ may be an ester bond or an arylene group, and specifically may be an ester bond or a benzylene group. In Formula 4, $Y_4$ may be an alkylene group having 1 to 20 carbon atoms. In Formula 4, $R_{17}$, $R_{18}$ and $R_{19}$ may be each independently an alkyl group having 1 to 30 carbon atoms, an alkylalkanoate group having 1 to 30 carbon atoms or an aryl group, and specifically may be an alkyl group having 1 to 30 carbon atoms or 8 to 20 carbon atoms. In Formula 4, $Z^-$ may be $Cl^-$, $Br^-$, $I^-$, $CH_3SO_3^-$ or $CH_3CO_2^-$. $R_{17}$, $R_{18}$ and $R_{19}$ in Formula 4 may be each independently an alkyl group having 10 or more carbon atoms or 12 or more carbon atoms, and may be an alkyl group having 18 or less carbon atoms or 16 or less carbon atoms.

When the compound represented by Formula 4 above is contained in the polymerizable composition as the cationic surfactant, the content of the cationic group imparted to the surface of the polymer capsule derived from the polymerizable composition can be increased and stability, fabric adhesion or the like of the polymer capsules can be improved An example of the compound represented by Formula 4 above may include compounds of Formulas 4-1 to 4-4 below:

[Formula 4-1]

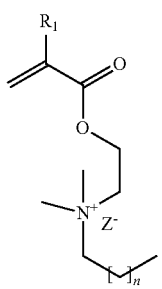

[Formula 4-2]

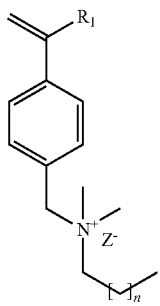

[Formula 4-3]

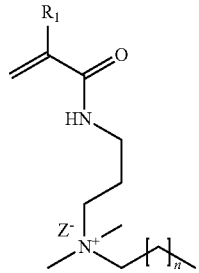

[Formula 4-4]

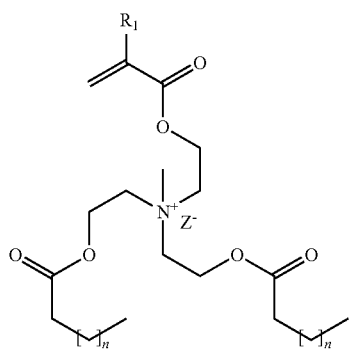

In Formulas 4-1 to 4-4 above, $R_1$ may be hydrogen or an alkyl group having 1 to 6 carbon atoms or 1 to 4 carbon atoms, and $Z^-$ may be $Cl^-$, $Br^-$, $I^-$, $CH_3SO_3^-$ or $CH_3CO_2^-$. In Formulas 4-1 to 4-4 above, each n may be independently an integer of 1 to 28, 1 to 24 or 2 to 20.

When the compound represented by Formula 1 above is included in the polymerizable composition as the crosslinkable monomer and the cationic surfactant, the polymerizable composition may comprise the compound represented by Formula 3 above and the compound represented by Formula 4. That is, when the compound represented by Formula 1 above is included in the polymerizable composition as the crosslinkable monomer and the cationic surfactant, the compound represented by Formula 1 above may comprise the compounds represented by Formula 3 and Formula 4 above.

As long as the polymerizable monomer contained in the polymerizable composition of the present application is one capable of forming polymer capsules by polymerization with the compound represented by Formula 1 above, and specifically one capable of forming polymer capsules by polymerization with the crosslinkable monomer, which is a compound represented by Formula 3 above, and/or the cationic surfactant, which is a compound represented by Formula 4 above, it is not particularly limited. An example of the polymerizable monomer may include a (meth)acrylic acid ester compound, a (meth)acrylamide compound, a styrene compound, a vinyl ether compound, a vinyl ester compound, a (meth)acrylonitrile compound, and the like. Specifically, as the polymerizable monomer, a (meth)acrylic acid ester compound or a styrene compound can be used, without being limited thereto.

The (meth)acrylic acid ester compound may be an alkyl (meth)acrylate having an alkyl group having 1 or more carbon atoms, where an alkyl (meth)acrylate having an alkyl group having 20 or less carbon atoms, 18 or less carbon atoms, 16 or less carbon atoms, 14 or less carbon atoms or 12 or less carbon atoms may be used. An examples of such a monomer may include methyl (meth)acrylate, ethyl (meth) acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth) acrylate, 2-ethylbutyl (meth)acrylate, n-octyl (meth)acrylate, isobornyl (meth)acrylate, isooctyl (meth)acrylate, isononyl (meth)acrylate, lauryl (meth)acrylate, and the like.

The styrene compound may be styrene or alkyl styrene. The alkylstyrene may be styrene to which an alkyl group having 1 to 8 carbon atoms, 1 to 6 carbon atoms or 1 to 4 carbon atoms is bonded. The alkylstyrene can be exemplified by a nuclear alkyl-substituted styrene such as p-methylstyrene, 2,4-dimethylstyrene or ethylstyrene; or α-alkyl-substituted styrene such as α-methylstyrene or α-methyl-p-methylstyrene, and the like, but is not limited thereto.

The polymerizable composition may comprise the polymerizable monomer in an amount of 15 wt % to 85 wt %. Specifically, the polymerizable composition may comprise the polymerizable monomer in a content of 17 wt % or more, 19 wt % or more, 21 wt % or more, 23 wt % or more, 25 wt % or more, 27 wt % or more, 29 wt % or more, 31 wt % or more, 33 wt % or more, 35 wt % or more, or 37 wt % or more, and may comprise it in a content of 83 wt % or less, 81 wt % or less, 79 wt % or less, 77 wt % or less, 75 wt % or less, 73 wt % or less, 71 wt % or less, 69 wt % or less, 67 wt % or less, 65 wt % or less, 63 wt % or less, 61 wt % or less, 59 wt % or less, 57 wt % or less, 55 wt % or less, 53 wt % or less, 51 wt % or less, or 49 wt % or less. As the content of the polymerizable monomer contained in the polymerizable composition satisfies the above range, the polymer capsules can be effectively formed.

When the polymerizable composition of the present application comprises the compound represented by Formula 3 above as the crosslinkable monomer, the polymerizable composition may comprise the compound represented by Formula 3 in a range of 0.1 parts by weight to 30 parts by weight per 100 parts by weight of the polymerizable monomer. The polymerizable composition may comprise the compound represented by Formula 3 in an amount of 0.1 parts by weight to 15 parts by weight per 100 parts by weight of the polymerizable monomer. Specifically, the polymerizable composition may comprise the compound represented by Formula 3 above in an amount of 0.5 part by weight or more, 0.75 part by weight or more, or 1 part by weight or more, and 10 parts by weight or less, 7.5 parts by weight or less, or 6 parts by weight or less, per 100 parts by weight of the polymerizable monomer.

In addition, when the polymerizable composition comprises the compound represented by Formula 3 above as the crosslinkable monomer, the polymerizable composition may comprise the compound represented by Formula 3 in an amount of 0.1 wt % to 5 wt %. Specifically, the polymerizable composition may comprise the compound represented by Formula 3 in an amount of 0.2 wt % or more, 0.3 wt % or more, or 0.4 wt % or more, and may comprise it in a content of 4 wt % or less, 3 wt % or less, or 2.5 wt % or less.

When the content of the compound of Formula 3 satisfies the above range, polymer capsules in which cationic groups are introduced on the surfaces through emulsion polymerization can be effectively produced, and polymer capsules containing an active substance such as a fragrance therein can be produced.

When the polymerizable composition of the present application comprises the compound represented by Formula 4 above as the cationic surfactant, the polymerizable composition may comprise the compound represented by Formula 4 above in an amount of 1 part by weight to 30 parts by weight per 100 parts by weight of the polymerizable monomer. Specifically, the polymerizable composition may comprise the compound represented by Formula 4 above in an amount of 1 part by weight or more, 2 parts by weight or more, 3 parts by weight or more, 4 parts by weight or more, or 5 parts by weight or more, and 30 parts by weight or less, 29 parts by weight or less, 28 parts by weight or less, 27 parts by weight or less, 26 parts by weight or less, or 25 parts by weight or less, per 100 parts by weight of the polymerizable monomer.

In addition, the polymerizable composition may comprise the compound represented by Formula 4 above in an amount of 0.5 wt % to 10 wt %. Specifically, the polymerizable composition may comprise the compound represented by Formula 4 above in an amount of 1 wt % or more, 1.5 wt % or more, 2 wt % or more, and may comprise it an amount of 9.5 wt % or less, 9 wt % or less, or 8 wt % or less. When the content of the compound represented by Formula 4 above is included in the polymerizable composition to satisfy the above range, an effective component such as a fragrance can be effectively supported inside the polymer capsules formed from the polymerizable composition of the present application.

The polymerizable composition of the present application may further comprise a second crosslinkable monomer and/or a second ionic surfactant, in addition to the above-described compound and the polymerizable monomer.

The second crosslinkable monomer is not particularly limited as long as it is a compound having two or more unsaturated vinyl groups in one molecule and is capable of inducing the crosslinking structure of the polymer during polymerization. For example, the second crosslinkable monomer may include ethylene glycol di(meth)acrylate, diethylene glycol di(meth)acrylate, 1,6-hexyl di(meth)acrylate, divinylbenzene, trimethylolpropane tri(meth)acrylate, pentaerythritol tetra(meth)acrylate or the like, but is limited thereto.

The second crosslinkable monomer may be contained in the polymerizable composition in an amount of 0.1 wt % to 5 wt %. In addition, when the compound represented by Formula 3 above and the second crosslinkable monomer are simultaneously contained in the polymerizable composition, the sum of the used amounts of the compound represented by Formula 3) and the second crosslinkable monomer may be in a range of 0.2 wt % to 10 wt % per the polymerizable composition.

The second ionic surfactant may comprise one or more selected from cationic surfactants for general fabric softeners, and the kind thereof is not particularly limited. For example, the second ionic surfactant may comprise one or more selected from the group consisting of diester ammonium methosulfate, imidazoline ammonium methosulfate, cetyltrimethylammonium chloride, dipalmitoylethylhydroxyethylammonium methosulfate, behentrimonium chloride, steatrimonium chloride, cetrimonium bromide, behentrimonium methosulfate and stearamidopropyldimethylamine.

The second ionic surfactant may be included in the polymerizable composition in an amount of 0.1 wt % to 5 wt %. In addition, when the compound represented by Formula 4 above and the second ionic surfactant are simultaneously contained in the polymerizable composition, the sum of the used amounts of the compound represented by Formula 4 and the second ionic surfactant may be in a range of 0.2 wt % to 10 wt % per the polymerizable composition.

The polymerizable composition of the present application may further comprise a radical initiator. Specifically, the radical initiator may be a photopolymerization initiator or a thermal polymerization initiator, and more specifically, may be a thermal polymerization initiator. The thermal polymerization initiator is not particularly limited as long as it is a substance which is decomposed by heat to generate a radical and is capable of initiating polymerization of a vinyl compound. As the thermal polymerization initiator, for example, a known substance such as an azo-based compound or an organic peroxide may be used, and it may include, for example, at least one of azobisisobutyronitrile, azobiscyanovaleric acid, 2,2'-azobis-(2,4-dimethyl)valeronitrile, dilauryl peroxide, tertiary butyl peroxide and diisopropyl peroxydicarbonate, but is not limited thereto.

The polymerizable composition may comprise the radical initiator in an amount of 0.5 parts by weight to 5 parts by weight per 100 parts by weight of the radical polymerizable monomer. Specifically, the polymerizable composition may comprise the radical initiator in an amount of 0.75 parts by weight or more, or 1 part by weight or more, and 3 parts by weight or less, or 1.5 parts by weight or less, per 100 parts by weight of the polymerizable monomer.

The polymerizable composition of the present application may comprise the radical initiator in an amount of 0.1 wt % or more and 1 wt % or less. Specifically, the polymerizable composition may comprise the radical initiator in an amount of 0.2 wt % or more, 0.3 wt % or more, or 0.4 wt % or more, and may comprise it in an amount of 0.9 wt % or less, 0.8 wt % or less, 0.7 wt % or less, 0.6 wt % or less, or 0.5 wt % or less. When the content of the radical initiator is adjusted to the above range, the yield of the polymerization reaction is sufficiently high, so that it is possible to form rigid polymer capsules.

The polymerizable composition may further comprise a fragrance. Specifically, as the polymerizable composition further comprises a fragrance, when it is polymerized to form polymer capsules, the fragrance can be supported inside the polymer capsules.

A specific example of the fragrance that can be included in the polymerizable composition of the present application may include one or more selected from the group consisting of benzylisoeugenol, dimethyl anthranilate (2-methyl-aminomethyl benzoate), cetyl acetate, 5-(2-methylene-6,6-dimethylcyclohexyl)-4-penten-3-one, 2-methyl-4-(2,2,3-trimethyl-3-1-yl)-2-buten-1-ol), tricyclodecylpropyl oleate, tricyclodecyl acetate, α-hexylcinnamic aldehyde, 3a,6,6,9a-tetramethyldodecahydronaphtho[2,1-b]furan, methyl-3-(trimethyl-2,2,3-cyclopenten-3-yl-1)-5-pentano1-2,2,6-dinitro-3,4,5-trimethyl-tert-butyl benzene, 2-acetyl-1,2,3,4,5,6,7,8-octahydro-2,3,8,8-tetramethylnaphthalene, p-tert-butyl-α-methylhydrocinnamic aldehyde, trichloromethylphenylvinyl acetate, β-naphthol methyl ether, acetyl cetylene, anisyl acetone (p-methoxyphenyl butanone), 4-(4-hydroxy-4-methylpentyl-3-cyclohexen-1-carboxy aldehyde, a terpene-based alcohol having 10 to 15 carbon atoms, and an aromatic alcohol having 7 to 15 carbon atoms. However, the type of the fragrance is not particularly limited, which may be selected from fragrances known in the art which can be applied to fabric softeners.

The polymerizable composition may comprise the fragrance in an amount of 15 parts by weight to 75 parts by weight per 100 parts by weight of the polymerizable monomer. Specifically, the polymerizable composition may comprise the fragrance in an amount of 17 parts by weight or more, 19 parts by weight or more, 21 parts by weight or more, 22 parts by weight or more, 23 parts by weight or more, 24 parts by weight or more, or 25 parts by weight or more, and 70 parts by weight or less, 65 parts by weight or less, 60 parts by weight or less, or 55 parts by weight or less, per 100 parts by weight of the polymerizable monomer.

The polymerizable composition may comprise the fragrance in an amount of 5 wt % to 30 wt %. Specifically, the polymerizable composition may comprise the fragrance in an amount of 9 wt % or more, or 12 wt % or more, and may comprise it in an amount of 25 wt % or less, or 20 wt % or less.

Within the above-described content of the fragrance, the polymer capsules derived from the polymerizable composition sufficiently collect the fragrance, whereby sufficient aroma transmission force can be ensured. In addition, the polymer capsules can be stably polymerized within the above-described content range of the fragrance.

The polymerizable composition of the present application may further comprise an aqueous solvent, specifically water, in order to form polymer capsules more effectively. The polymer capsules of the present application can be formed by emulsion polymerization of the components contained in the polymerizable composition. Accordingly, when the polymerizable composition comprises an aqueous solvent, the cationic surfactant contained in the polymerizable composition can smoothly flocculate, so that the polymer capsules can be formed into the form of particles, as described below. In addition, the content of the aqueous solvent is not particularly limited, which may be 100 parts by weight to 500 parts by weight, specifically 150 parts by weight or more, 200 parts by weight or more, or 240 parts by weight or more, and may be 450 parts by weight or less, 400 parts by weight or less, 350 parts by weight or less, 300 parts by weight or less, or 250 parts by weight or less, per 100 parts by weight of the polymerizable composition excluding the aqueous solvent.

The present application also relates to polymer capsules.

The polymer capsules of the present application comprises a shell material containing a unit of the compound represented by Formula 1 above and a unit of the polymerizable monomer. In the present application, the unit of a certain compound or a certain monomer may mean a form in which the compound or monomer undergoes polymerization to form a skeleton of the polymer, for example, a main chain or a side chain.

The polymer capsules may be formed from the above-described polymerizable composition, and specifically may be a reaction product of the polymerizable composition, more specifically, may be a polymer of the polymerizable composition, and most specifically, may be an emulsion polymer of the polymerizable composition.

The details of the cationic surfactant; the polymerizable monomer; and the compound of Formula 1 below are the same as those described above, and thus their details will be omitted. In addition, when the compound of Formula 1 is contained in the polymerizable composition in the form of Formula 3 and/or Formula 4 above, the shell material may comprise the unit represented by Formula 3 above and/or Formula 4 above.

The shell material may comprise a reaction product of the polymerizable composition as a main component. In this specification, the fact that a certain component comprises any other component as a main component means that it may comprise any other component in an amount of 55 wt % or more, 60 wt % or more, 65 wt % or more, 70 wt % or more, 75 wt % or more, 80 wt % or more, 85 wt % or more, or 90 wt % or more, relative to the total weight of a certain component, where the upper limit thereof is not particularly limited, but may be, for example, about 98 wt % or less, or 95 wt % or less.

The polymer capsule may be one that a cation exists on the surface thereof, and specifically, the polymer capsule may be one that a cationic group is introduced on the surface by chemical bonding. That is, the polymer capsules of the present application may be cationic polymer capsules. In the polymer capsule, cations dervied from the compound represented by Formula 1 are present on the surface.

Also, the cation group may be a quaternary ammonium group. That is, the polymer capsules may be those that cations derived from the crosslinkable monomer represented by Formula 1, specifically Formula 3 and/or the ionic surfactant represented by Formula 4 are present on the surfaces. This can improve adhesion to fibers and the like.

Furthermore, when the polymerizable composition further comprises a fragrance, the polymer capsule prepared therefrom may further comprise the fragrance supported therein as well. Since the fragrance is the same as that contained in the polymerizable composition, the detail thereof will be omitted.

The shape of the polymer capsules of the present application is not particularly limited, but may be, for example, a particle shape. When the shape of the polymer capsules of the present application is a particle type, the particle diameter of the particles may be in a range of 50 nm to 750 nm. In this specification, the term particle diameter may mean particle diameter, and the particle diameter may be a Z-average value of diameters of polymer capsules measured by a dynamic light scattering method after diluting the polymer capsules with 1% aqueous solution.

Specifically, the particle diameter of the polymer capsules may be 60 nm or more, 70 nm or more, 80 nm or more, 90 nm or more, or 100 nm or more, and may be 740 nm or less, 730 nm or less, 720 nm or less, 710 nm or less, 700 nm or less, 690 nm or less, 680 nm or less, or 670 nm or less.

The present application relates to a method for producing polymer capsules.

The method for producing polymer capsules of the present application may comprise a step of emulsion-polymerizing the polymerizable composition. For example, in order to prepare the polymer capsules of the present application, oil-in-water type emulsion polymerization can be preferably applied. A pre-emulsion is prepared by adding the compound of Formula 1 as described above to the water from which the ionic components are removed and applying strong shear force thereto, and a mixture of the surfactant, the polymerizable monomer and the fragrance as described above is introduced thereto to form emulsified liquid droplets. Thereafter, the polymer capsules can be prepared by removing oxygen through nitrogen purging, heating the reactant to an appropriate reaction temperature, and then introducing a thermal polymerization initiator as a initiator.

The present application also relates to a fabric softener composition comprising the above polymer capsules, or polymer capsules prepared as above.

The fabric softener composition of the present application may comprise the polymer capsules in a content of 30 wt % or more, 35 wt % or more, 40 wt % or more, 45 wt % or more, or 50 wt % or more and a content of 80 wt % or less, 75 wt % or less, 70 wt % or less, 65 wt % or less, 60 wt % or less, 55 wt % or less, or 50 wt % or less, per the total weight of the fabric softener composition. The content of the polymer capsules in the fabric softener composition may be measured based on the solid content of the polymer capsules.

The fabric softener composition of the present application may further comprise a cationic softening component and/or an emulsion stabilizing agent.

The cationic softening component is for imparting soft texture to the fibers, and for example, a cationic surfactant can be used. The cationic surfactant may be the same as or different from the above-mentioned cationic surfactant, which may be exemplified by diester ammonium methosulfate, imidazoline ammonium methosulfate, cetyltrimethylammonium chloride, dipalmitoylethylhydroxyethylammonium methosulfate, behentrimonium chloride, steatrimonium chloride, cetrimonium bromide, behentrimonium methosulfate or stearamidopropyldimethylamine, and the like, but is not limited thereto. The cationic softening component may be included in a ratio of 10 wt % to 99 wt % per the total fabric softener composition, but is not limited thereto.

As the emulsion stabilizing agent, a nonionic surfactant or an amphoteric surfactant can be used. An example of the nonionic surfactants may include polyoxyethylene alkyl or alkenyl ethers and alkyl phenyl ethers, polyoxyethylene alkyl or alkenyl esters and hydroxy fatty acid esters, sorbitan fatty acid alkyl esters and their ethylene oxide adducts, polyoxyethylene alkyl or alkenyl amine, or glyceryl monoalkyl and alkenyl esters, having 10 to 20 carbon atoms, and the like, and an example of the amphoteric surfactant may include alkyldimethyl betaine, alkyldimethylhydroxyethyl or alkyldimethylhydroxypropyl betaine, having 8 to 22 carbon atoms, or lecithin, and the like, without being limited thereto. These surfactants are suitably used alone or in a mixture of two or more thereof in an amount of 5 to 40 wt % relative to the content of the cationic softening component. Stability of the product and adsorption of the cationic softening component to clothes can be smoothly achieved within the range of the emulsion stabilizing agent, and accordingly the softening effect can be improved.

The fabric softener composition according to the present application may also comprise an organic dispersion stabilizer or an inorganic dispersion stabilizer. As the suitable organic or inorganic dispersion stabilizer, an organic compound such as a lower alcohol or glycol of less than C8, a higher alcohol of C14 or more and urea, and an inorganic compound such as magnesium chloride, sodium chloride, calcium chloride and sodium nitrate, and the like may be used alone or in a mixture of two or more thereof, but preferably, ethanol, isopropyl alcohol, methyl alcohol, ethylene glycol, propylene glycol, hexylene glycol, cetyl alcohol, stearyl alcohol, magnesium chloride, sodium chloride, calcium chloride, sodium nitrate, and the like may be used alone or in a mixture of two or more thereof. The dispersion stabilizer may be contained in a ratio of 0.01 wt % to 10 wt % per the entire fiber softener composition, but is not limited thereto.

Besides, preservatives, fungicides, pigments, antioxidants, antifoaming agents, and the like, which are used as additives for a general fabric softener, can be added in a small amount of less than 3 wt % per the entire fabric softener composition in the range without affecting the product stability.

Advantageous Effects

The present application can provide a polymerizable composition capable of effectively encapsulating a fragrance material and chemically bonding a cationic group to the surface thereof to enhance adhesion to fibers.

In addition, since the polymer capsules according to the present invention can minimize the amount of the fragrance discharged without being attached to the fibers during washing, sufficient aromas can be provided even if a small amount of fragrance is used.

Mode for Invention

Hereinafter, the present application will be described with reference to examples. However, the following examples are provided to illustrate the present application and the scope of the present application is not limited to the following examples.

1. NMR (Nuclear Magnetic Resonance) Analysis

Compounds obtained in Preparation Examples were mixed in a solvent for NMR measurement (DMSO-D6, dimethyl sulfoxide-d6, Cambridge Isotope Laboratories) to prepare a sample having a concentration of about 10 mg/mL. NMR analysis of the sample was performed using a magnetic resonance apparatus (Varian Unity Inova 500 MHz).

2. Measurement of Particle Diameter of Polymer Capsules

The particle diameter of the polymer capsules was measured at a temperature of 25° C. using a Zetasizer 3000 from Malvern after dispersing the polymer capsules in water to have a concentration of 0.1 wt %.

3. Evaluation of Lingering Aroma Effect of Fabric Softener

A commercially available 100% cotton towel was washed and dewatered 5 times using a general laundry detergent in a standard usage with a washing machine, and then rinsed with each of fabric softener compositions according to Examples and Comparative Examples. The fabric softening agent was dissolved in water at 25° C. as a standard usage and used. The cotton towel was subjected to softening treatment in rinsing water (25° C.) and then dewatered, and conditioned at 20° C. and 65% relative humidity conditions for 24 hours. After conditioning, the aroma intensity was given as a score from a minimum of 1 point to a maximum of 5 points by an organoleptic evaluation test of skilled panelists (subjects), and the lingering aroma effect was quantified as a mean value of three times. Other test conditions are based on the test method in EL306 (fabric softener) among eco-label certification criteria of the Korea Environmental Industry & Technology Institute. As a result of the evaluation, when the score of the quantified lingering aroma effect was 4.5 points or more, it was evaluated as "very good (◎)"; when the score was 3.5 points or more and less than 4.5 points, it was evaluated as "good (O)"; when the score was 2.5 points or more and less than 3.5 points, it was evaluated as "normal (Δ)"; and when the score was less than 2.5 points, it was evaluated as "poor (X)."

PREPARATION EXAMPLE 1

Preparation of Crosslinkable Monomer XL1

57 g of 2-(N,N-dimethylamino)ethyl methacrylate, 50 g of 1,12-dibromododecane and 250 g of a mixed solvent (methanol: acetonitrile mixed in a mass ratio of 3:7) were placed in a 500 mL round bottom flask, stirred at 50° C. for 24 hours and reacted. As a result of performing NMR analysis of the reaction product, it was confirmed that the N—CH$_3$ peak near 2.5 ppm was shifted to near 3.5 ppm, whereby it contained an N$^+$—CH$_3$ cation as in Formula A below. After the reaction, the resulting precipitate was removed with a vacuum filter, washed with acetone, and then dried to obtain a crosslinkable monomer XL1 of Formula A below:

[Formula A]

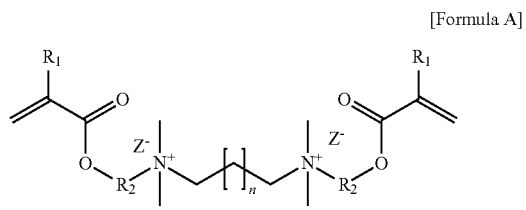

In Formula A, R$_1$ is a methyl group, R$_2$ is an ethylene group, Z$^-$ is a bromine ion, and n is 10.

<NMR Analysis Results in Preparation Example 1—H$^1$ NMR (ppm, DMSO-D$_6$)>

6.07 (2H, vinyl), 5.76 (2H, vinyl), 4.51 (4H, CO$_2$CH$_2$C), 3.71 (4H, CCH$_2$N$^+$), 3.37 (4H, N$^+$CH$_2$C), 3.09 (12H, N$^+$CH$_3$), 1.90 (6H, C=C—CH$_3$), 1.66 (4H, N$^+$CCH$_2$), 1.26 (16H, CCH$_2$C)

PREPARATION EXAMPLE 2

Preparation of Crosslinkable Monomer XL2

35 g of N,N,N',N'-tetramethyl-1,6-hexanediamine, 74 g of 4-vinylbenzyl chloride and 250 g of a mixed solvent (methanol: acetonitrile mixed in a mass ratio of 3:7) were placed in a 500 mL round bottom flask, stirred at 50° C. for 24 hours and reacted. As a result of performing NMR analysis of the reaction product, it was confirmed that the N—CH$_3$ peak near 2.5 ppm was shifted to near 3.5 ppm, whereby it contained an N$^+$—CH$_3$ cation as in Formula B below. After the reaction, the resulting precipitate was removed with a vacuum filter, washed with acetone, and then dried to obtain a crosslinkable monomer XL2 of Formula B below.

[Formula B]

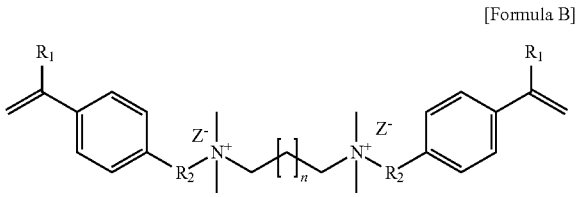

In Formula B, $R_1$ is hydrogen, $R_2$ is a methylene group, $Z^-$ is a chlorine ion, and n is 4.

<NMR Analysis Results in Preparation Example 2—$H^1$ NMR (ppm, DMSO-$D_6$)>

7.60 (4H, aromatic), 7.11 (4H, aromatic), 6.72 (2H, vinyl), 5.76 (2H, vinyl), 5.25 (2H, vinyl), 4.50 (4H, Phenyl-$CH_2$—$N^+$), 3.38 (4H, $N^+CH_2C$), 3.10 (12H, $N^+CH_3$), 1.76 (4H, $N^+CCH_2$), 1.30 (4H, $CCH_2C$)

PREPARATION EXAMPLE 3

Preparation of Cationic Surfactant S1

34 g of 2-(N,N-dimethylamino)ethyl methacrylate and 250 g of acetone were placed in a 500 mL round bottom flask and stirred, and 70 g of 1-bromohexadecane was slowly added in drops. After the introduction was completed, the reaction mixture was stirred at 35° C. for 48 hours and reacted. The precipitate generated after the reaction was removed with a vacuum filter, washed with hexane and then dried to obtain a cationic surfactant S1 of Formula C below.

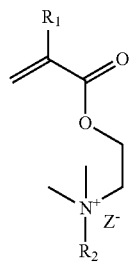

[Formula C]

In Formula C, $R_1$ is a methyl group, $R_2$ is an alkyl group having 16 carbon atoms, and $Z^-$ is a bromine ion.

<NMR Analysis Results in Preparation Example 3—$H^1$ NMR (ppm, measurement Solvent: $CDCl_3$)>

6.16 (1H, vinyl), 5.69 (1H, vinyl), 4.66 (2H, $CO_2CH_2C$), 4.19 (2H, $CCH_2N^+$), 3.62 (2H, $N^+CH_2C$), 3.52 (6H, $N^+CH_3$), 1.96 (3H, C=C—$CH_3$), 1.76 (2H, $N^+CCH_2$), 1.26 (26H, $CCH_2C$), 0.89 (3H, $CCH_3$)

PREPARATION EXAMPLE 4

Preparation of Cationic Surfactant S2

53 g of N,N-dimethyldodecylamine and 250 g of acetone were placed in a 500 mL round bottom flask and stirred, and 40 g of 4-vinylbenzyl chloride was slowly added in drops thereto. After the introduction was completed, the reaction mixture was stirred at 35° C. for 48 hours and reacted. After the reaction, the resulting precipitate was removed with a vacuum filter, washed with hexane and then dried to obtain a cationic surfactant S2 of Formula D below.

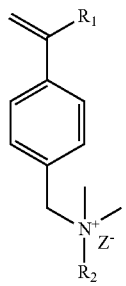

[Formula D]

In Formula D, $R_1$ is a hydrogen atom, $R_2$ is an alkyl group having 12 carbon atoms, and $Z^-$ is a chlorine ion.

<NMR analysis results in Preparation Example 4 - $H^1$ NMR (ppm, DMSO-D6)>

7.59 (2H, aromatic), 7.11 (2H, aromatic), 6.71 (1H, vinyl), 5.76 (1H, vinyl), 5.26 (1H, vinyl), 4.48 (2H, phenyl-$CH_2$—$N^+$), 3.35 (2H, $N^+CH_2C$), 3.12 (6H, $N^+CH_3$), 1.76 (2H, $N^+CCH_2$), 1.30 (18H, $CCH_2C$), 0.90 (3H, $CCH_3$)

PREPARATION EXAMPLE 5

Preparation of Polymer Capsules C1

2 g of cetrimonium bromide (CTAB) and 266 g of distilled water were placed in a 500 mL round bottom flask and stirred at 600 rpm for 30 minutes. A mixed liquid of 38 g of methyl methacrylate (MMA), 2 g of the crosslinkable monomer XL1 in Preparation Example 1, and 20 g of Comely 450 from IFF Co., Ltd. as a fragrance was introduced thereto, and then the reactor was sealed. The mixture was purged with nitrogen for 30 minutes with stirring to remove dissolved oxygen. After the reaction mixture was heated to a temperature of 60° C., 0.4 g of sodium persulfate (SPS) was introduced as a thermal polymerization initiator and after the reaction was performed for 5 hours, the reaction was completed to prepare the polymer capsules C1.

PREPARATION EXAMPLE 6

Preparation of Polymer Capsules C2

2 g of cetrimonium bromide (CTAB) and 266 g of distilled water were placed in a 500 mL round bottom flask and stirred at 600 rpm for 30 minutes. A mixed liquid of 38 g of styrene (ST), 2 g of the crosslinkable monomer XL2 in Preparation Example 2, and 20 g of Comely 450 from IFF Co., Ltd. as a fragrance were introduced thereto, and then the reactor was sealed. The mixture was purged with nitrogen for 30 minutes with stirring to remove dissolved oxygen. After the reaction mixture was heated to a temperature of 60° C., 0.4 g of sodium persulfate (SPS) was introduced as a thermal polymerization initiator and after the reaction was performed for 5 hours, the reaction was completed to prepare the polymer capsules C2.

PREPARATION EXAMPLES 7 TO 18

Preparation of Polymer Capsules C3 to C14

The polymer capsules were prepared in the same method as the polymerization method shown in Preparation Example 5 and Preparation Example 6, except that the employed materials and their contents were adjusted as shown in Tables 1 to 3 below.

PREPARATION EXAMPLE 19

Preparation of Polymer Capsules B1

The polymer capsules were prepared in the same manner as in Preparation Example 5, except that a nonionic crosslinkable monomer, ethylene glycol dimethacrylate (EGDMA), was used instead of XL1 in Preparation Example 1 as the crosslinkable monomer, and the results were shown in Table 3 below.

PREPARATION EXAMPLE 20

Preparation of Polymer Capsules B2

The polymer capsules were prepared in the same manner as in Preparation Example 5, except that 2 g of a nonionic surfactant, Brij® L23 (Sigma Aldrich) was used as the surfactant, and a nonionic crosslinkable monomer, ethylene glycol dimethacrylate (EGDMA), was used instead of XL1 in Preparation Example 1 as the crosslinkable monomer, and the results were shown in Table 3 below.

TABLE 1

|  |  | C1 | C2 | C3 | C4 | C5 |
|---|---|---|---|---|---|---|
| Surfactant | Type | CTAB | CTAB | CTAB | CTAB | CTAB |
|  | Content | 2 | 2 | 2 | 2 | 2 |
| polymerizable monomer | Type | MMA | ST | MMA | MMA | ST |
|  | Content | 38 | 38 | 47.5 | 39.6 | 47.5 |
| Crosslinkable monomer | Type | XL1 | XL2 | XL1 | XL1 | XL2 |
|  | Content | 2 | 2 | 2.5 | 0.4 | 2.5 |
| Fragrance | Type | Comely 450 | Comely 450 | Comely 450 | Comely 450 | Comely 450 |
|  | Content | 20 | 20 | 12 | 20 | 12 |
| Thermal polymerization initiator | Type | SPS | SPS | SPS | SPS | SPS |
|  | Content | 0.4 | 0.4 | 0.5 | 0.4 | 0.5 |
| Water |  | 248 | 248 | 248 | 248 | 248 |
| Particle diameter (nm) |  | 560 | 370 | 140 | 640 | 110 |

CTAB: cetrimonium bromide,
MMA: methyl methacrylate,
ST: styrene,
EGDMA: ethylene glycol dimethacrylate,
SPS: sodium persulfate,
Content unit: weight (g)

TABLE 2

|  |  | C6 | C7 | C8 | C9 | C10 |
|---|---|---|---|---|---|---|
| Surfactant | Type | S1 | S2 | S1 | S1 | S2 |
|  | Content | 2 | 2 | 2 | 2 | 2 |
| polymerizable monomer | Type | MMA | ST | MMA | MMA | MMA |
|  | Content | 38 | 38 | 47.5 | 39.6 | 38 |
| Crosslinkable monomer | Type | EGDMA | DVB | EGDMA | EGDMA | EGDMA |
|  | Content | 2 | 2 | 2.5 | 0.4 | 2 |
| Fragrance | Type | Comely 450 | Comely 450 | Comely 450 | Comely 450 | Comely 450 |
|  | Content | 20 | 20 | 12 | 20 | 20 |
| Thermal polymerization initiator | Type | SPS | SPS | SPS | SPS | SPS |
|  | Content | 0.4 | 0.4 | 0.5 | 0.4 | 0.5 |
| Water |  | 248 | 248 | 248 | 248 | 248 |
| Particle diameter (nm) |  | 670 | 440 | 65 | 870 | 710 |

CTAB: cetrimonium bromide,
MMA: methyl methacrylate,
ST: styrene,
DVB: divinylbenzene,
EGDMA: ethylene glycol dimethacrylate,
SPS: sodium persulfate,
Content unit: weight (g)

TABLE 3

|  |  | C11 | C12 | C13 | C14 | B1 | B2 |
|---|---|---|---|---|---|---|---|
| Surfactant | Type | S1 | S1 | S1 | S1 | CTAB | Brij ® L23 |
|  | Content | 8 | 8 | 4 | 2 | 2 | 2 |
| polymerizable monomer | Type | MMA | MMA | MMA | MMA | MMA | MMA |
|  | Content | 38 | 39.6 | 38 | 38 | 38 | 38 |
| Crosslinkable monomer | Type | XL1 | XL1 | XL1 | XL1 | EGDMA | EGDMA |
|  | Content | 2 | 0.4 | 2 | 2 | 2 | 2 |
| Fragrance | Type | Comely 450 | Comely 450 | Comely 450 | Comely 450 | Comely 450 | Comely 450 |
|  | Content | 20 | 20 | 20 | 20 | 20 | 20 |

TABLE 3-continued

|  |  | C11 | C12 | C13 | C14 | B1 | B2 |
|---|---|---|---|---|---|---|---|
| Thermal polymerization initiator | Type | SPS | SPS | SPS | SPS | SPS | SPS |
|  | Content | 0.4 | 0.4 | 0.4 | 0.4 | 0.4 | 0.4 |
| Water |  | 242 | 242 | 246 | 248 | 248 | 248 |
| Particle diameter (nm) |  | 250 | 100 | 670 | 210 | 450 | 710 |

CTAB: cetrimonium bromide,
MMA: methyl methacrylate,
ST: stylene,
EGDMA: ethylene glycol methacrylate,
SPS: sodium persulfate,
Content unit: weight (g)

Example 1. Preparation of Fabric Softener Composition

A fabric softener composition was prepared using the polymer capsules C1 of Preparation Example 5. Specifically, the polymer capsules C1 of Preparation Example 5 were mixed with diester ammonium methosulfate, polyoxyethylene alkyl ether, ethylene glycol and additives (dye, preservative, antioxidant, defoamer, etc.) in the ratios of Table 4 below to prepare a fabric softener. The residual amount of water means purified water added so that the sum of all components is 100.

Examples 2 to 14. Preparation of Fabric Softener Compositions

Fabric softener compositions were prepared in the same manner as in Example 1, except that the kinds and contents of the polymer capsules were adjusted as shown in Tables 4 to 6 below.

Comparative Example 1. Preparation of Fabric Softener Composition

The non-encapsulated commercial fragrance Comely 450 (IFF), and diester ammonium methosulfate, polyoxyethylene alkyl ether, ethylene glycol and additives (dye, preservative, antioxidant, defoamer, etc.) were adopted in the composition of Table 6 below to prepare a fabric softener composition.

Comparative Example 2. Preparation of Fabric Softener Composition

A fabric softener composition was prepared in the same manner as in Example 1, except that the polymer capsules B1 of Preparation Example 14 were used.

Comparative Example 3. Preparation of Fabric Softener Composition

A fabric softener composition was prepared in the same manner as in Example 1, except that the polymer capsules B2 of Preparation Example 15 were used.

The constituents of the fabric softener compositions according to Examples and Comparative Examples, their contents and their lingering aroma effect evaluation results were described in Tables 4 to 6 below.

TABLE 4

|  |  | Example |  |  |  |  |  |
|---|---|---|---|---|---|---|---|
|  |  | 1 | 2 | 3 | 4 | 5 | 6 |
| Polymer capsules | Type | C1 | C2 | C3 | C4 | C5 | C6 |
|  | Content* | 4.7 (0.3) | 4.7 (0.3) | 7.9 (0.3) | 4.7 (0.3) | 7.9 (0.3) | 4.7 (0.3) |
| Surfactant |  | 5 | 5 | 5 | 5 | 5 | 5 |
| Emulsion stabilizing agent |  | 0.5 | 0.5 | 0.5 | 0.5 | 0.5 | 0.5 |
| Dispersion stabilizer |  | 0.05 | 0.05 | 0.05 | 0.05 | 0.05 | 0.05 |
| Others** |  | suitable amount | suitable amount | suitable amount | suitable amount | suitable amount | suitable amount |
| Water |  | residual amount | residual amount | residual amount | residual amount | residual amount | residual amount |
| Lingering aroma effect |  | ⊚ | ⊚ | ⊚ | ⊚ | ⊚ | ⊚ |

Surfactant: diester ammonium mehosulfate,

Emulsion stabilizing agent: polyoxyethylene alkyl ether,

Dispersion stabilizer: ethylene glycol,

Not-encapsulated Fragrance: Comely 450 (IFF Co., Ltd.),

Content unit: part by weight (g),

Content* of polymer capsules: g number of capsule emulsion, where number in parentheses is the content (g) of the supported fragrance,

**Others: to represent small amounts of additives such as pigments, antiseptics, antioxidants and defoamers

TABLE 5

| | | Example | | | | | |
|---|---|---|---|---|---|---|---|
| | | 7 | 8 | 9 | 10 | 11 | 12 |
| Polymer capsules | Type | C7 | C8 | C9 | C10 | C11 | C12 |
| | Content* | 4.7 (0.3) | 7.9 (0.3) | 4.7 (0.3) | 7.9 (0.3) | 4.7 (0.3) | 4.7 (0.3) |
| Surfactant | | 5 | 5 | 5 | 5 | 5 | 5 |
| Emulsion stabilizing agent | | 0.5 | 0.5 | 0.5 | 0.5 | 0.5 | 0.5 |
| Dispersion stabilizer | | 0.05 | 0.05 | 0.05 | 0.05 | 0.05 | 0.05 |
| Others** | | suitable amount | suitable amount | suitable amount | suitable amount | suitable amount | suitable amount |
| Water | | residual amount | residual amount | residual amount | residual amount | residual amount | residual amount |
| Lingering aroma effect | | ⊚ | ⊚ | ⊚ | ⊚ | ⊚ | ⊚ |

Surfactant: diester ammonium mehosulfate,
Emulsion stabilizing agent: polyoxyethylene alkyl ether
Dispersion stabilizer: ethylene glycol,
Not-encapsulated Fragrance: Comely 450 (IFF Co., Ltd.),
Content unit: part by weight (g),
Content* of polymer capsules: g number of capsule emulsion, where number in parentheses is the content (g) of the supported fragrance,
**Others: to represent small amounts of additives such as pigments, antiseptics, antioxidants and defoamers

TABLE 6

| | | Example | | Comparative Example | | |
|---|---|---|---|---|---|---|
| | | 13 | 14 | 1 | 2 | 3 |
| Polymer capsules | Type | C13 | C14 | | B1 | B2 |
| | Content* | 4.7 (0.3) | 4.7 (0.3) | | 4.7 (0.3) | 4.7 (0.3) |
| Not-encapsulated fragrance | | | | 0.3 | | |
| Surfactant | | 5 | 5 | 5 | 5 | 5 |
| Emulsion stabilizing agent | | 0.5 | 0.5 | 0.5 | 0.5 | 0.5 |
| Dispersion stabilizer | | 0.05 | 0.05 | 0.05 | 0.05 | 0.05 |
| Others | | suitable amount | suitable amount | suitable amount | suitable amount | suitable amount |
| Water | | residual amount | residual amount | residual amount | residual amount | residual amount |
| Lingering aroma effect | | ⊚ | ⊚ | Δ | Δ | Δ |

As can be seen from Tables 4 to 6 above, it can be confirmed that the fabric softener compositions according to Examples 1 to 14 using the compounds of the present application show excellent lingering aroma effect. On the other hand, despite the use of the same fragrance, it can be seen that the fabric softener compositions using only the non-encapsulated fragrance show slight lingering aroma effect. Also, it can be confirmed that the fabric softeners in accordance with Comparative Example 2 and Comparative Example 3 without using the compounds of the present application show slight lingering aroma effect. Accordingly, it can be seen that the fabric softener compositions comprising the polymer capsules prepared from the polymerizable composition of the present application show excellent lingering aroma effect.

The invention claimed is:

1. A polymerizable composition comprising a compound represented by Formula 3 below and a polymerizable monomer:

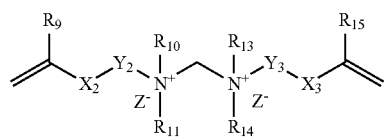

[Formula 3]

wherein, $R_9$ and $R_{15}$ are each independently hydrogen or an alkyl group, $X_2$ and $X_3$ are each independently an ester bond, an amide bond, a sulfonamide bond, a phosphoramide bond or an arylene group, $Y_2$ and $Y_3$ are each independently an alkylene group, $R_{10}$, $R_{11}$, $R_{13}$ and $R_{14}$ are each independently hydrogen or an alkyl group, $R_{12}$ is an alkylene group or an arylene group, and $Z^-$ is an anion.

2. The polymerizable composition according to claim 1, wherein $X_2$ and $X_3$ in Formula 3 are each independently an ester bond or an arylene group, and $R_{12}$ is an alkylene group having 2 to 12 carbon atoms.

3. The polymerizable composition according to claim 1, further comprising a compound represented by Formula 4 below:

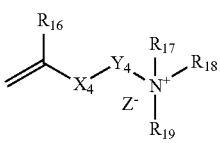

[Formula 4]

wherein, $R_{16}$ is hydrogen or an alkyl group, $X_4$ is an ester bond, an amide bond, a sulfonamide bond, a phosphoramide bond or an arylene group, $Y_4$ is an alkylene group, $R_{17}$, $R_{18}$ and $R_{19}$ are each independently an alkyl group, an alkylalkanoate group or an aryl group, and $Z^-$ is an anion.

4. The polymerizable composition according to claim 3, wherein $X_4$ in Formula 4 is an ester bond or an arylene group, and $R_{17}$, $R_{18}$ and $R_{19}$ are each independently an alkyl group having 8 to 20 carbon atoms.

5. The polymerizable composition according to claim 3, wherein the polymerizable composition comprises the compound represented by Formula 4 in an amount of 1 part by weight to 30 parts by weight per 100 parts by weight of the polymerizable monomer.

6. The polymerizable composition according to claim 1, wherein the polymerizable composition comprises the polymerizable monomer in an amount of 15 wt% to 85 wt% relative to a total weight of the polymerizable composition.

7. The polymerizable composition according to claim 1, wherein the polymerizable composition comprises the compound represented by Formula 3 in an amount of 0.1 parts by weight to 15 parts by weight per 100 parts by weight of the polymerizable monomer.

8. The polymerizable composition according to claim 1, further comprising a fragrance.

9. The polymerizable composition according to claim 8, wherein the polymerizable composition comprises the fragrance in an amount of 15 parts by weight to 75 parts by weight per 100 parts by weight of the polymerizable monomer.

10. Polymer capsules comprising a shell material containing a unit of a compound represented by Formula 1 below and a unit of a polymerizable monomer:

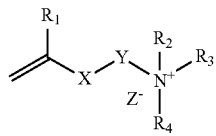

[Formula 1]

wherein, $R_1$ is hydrogen or an alkyl group, X is an ester bond, an amide bond, a sulfonamide bond, a phosphoramide bond or an arylene group, Y is an alkylene group, $R_2$ and $R_4$ are each independently hydrogen, an alkyl group, an alkylalkanoate group or an aryl group, $R_3$ is an alkyl group, an alkylalkanoate group, an aryl group or a functional group represented by Formula 2 below, and $Z^{31}$ is an anion:

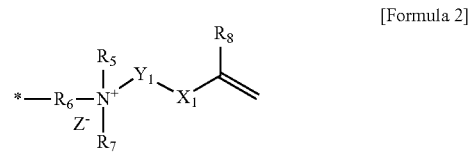

[Formula 2]

wherein, * is a site bonded with N+ in Formula 1, $R_6$ is an alkylene group or an arylene group, $R_5$ and $R_7$ are each independently an alkyl group, an alkylalkanoate group or an aryl group, $Y_1$ is an alkylene group, $X_1$ is an ester bond, an amide bond, a sulfonamide bond, a phosphoramide bond or an arylene group, $R_8$ is hydrogen or an alkyl group, and $Z^-$ is an anion.

11. The polymer capsules according to claim 10, wherein cations derived from the compound represented by Formula 1 are present on the surfaces.

12. The polymer capsules according to claim 10, further comprising a fragrance supported therein.

13. A fabric softener composition comprising the polymer capsules of claim 10.

* * * * *